United States Patent
Kumagai et al.

(10) Patent No.: US 9,512,270 B2
(45) Date of Patent: Dec. 6, 2016

(54) ORGANIC POLYMER POROUS BODY

(71) Applicant: KABUSHIKI KAISHA TOYOTA CHUO KENKYUSHO, Nagakute-shi, Aichi-ken (JP)

(72) Inventors: Hitoshi Kumagai, Nisshin (JP); Satoru Fujita, Nagoya (JP); Satoru Yamamoto, Nagoya (JP); Yoshiyuki Sakamoto, Toyota (JP); Takahiko Asaoka, Nagoya (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 390 days.

(21) Appl. No.: 14/183,921

(22) Filed: Feb. 19, 2014

(65) Prior Publication Data

US 2014/0242366 A1 Aug. 28, 2014

(30) Foreign Application Priority Data

Feb. 27, 2013 (JP) ................................. 2013-036918

(51) Int. Cl.
*C08G 73/06* (2006.01)
*C08G 61/12* (2006.01)

(52) U.S. Cl.
CPC ......... *C08G 73/0688* (2013.01); *C08G 61/122* (2013.01); *C08G 73/0616* (2013.01); *C08G 73/0627* (2013.01); *C08G 73/0644* (2013.01); *C08G 2261/17* (2013.01); *C08G 2261/3221* (2013.01); *C08G 2261/3328* (2013.01); *C08G 2261/3422* (2013.01); *C08G 2261/516* (2013.01)

(58) Field of Classification Search
USPC .................................................. 526/258, 261
See application file for complete search history.

(56) References Cited

FOREIGN PATENT DOCUMENTS

| WO | 2009/022187 A1 | 2/2009 |
| WO | WO-2009/022187 A1 * | 2/2009 |

OTHER PUBLICATIONS

Zhang et al., "4-(N,N-Dimethylamino) pyridine-Embedded Nanoporous Conjugated Polymer as a Highly Active Heterogeneous Organocatalyst," Chemistry-A European Journal, 2012, vol. 18, pp. 6328-6334.*
Shijie Ren et al., "1,3,5,-Triazine Based Microporous Organic Polymers: Synthesis and Applications," American Chemical Society Division of Polymeric Materials: Science and Engineering Fall 2012 PMSE PREPRINTS, 2012, vol. 107, pp. 530-531.*
Dawson et al., "Functionalized Conjugated Microporous Polymers," Macromolecules, 2009, vol. 42, pp. 8809-8816.*

(Continued)

*Primary Examiner* — Peter D Mulcahy
*Assistant Examiner* — Henry Hu
(74) *Attorney, Agent, or Firm* — Oliff PLC (57) ABSTRACT

There is provided an organic polymer porous body having a first cyclic structure equipped with a 6-membered ring (A) or a 5-membered ring having three bonds; a second cyclic structure equipped with a 6-membered ring (B) having two or three bonds; and a carbon-carbon triple bond that links the first cyclic structure to the second cyclic structure. At least one of the first cyclic structure and the second cyclic structure contains at least one nitrogen atom.

4 Claims, 3 Drawing Sheets

(56) References Cited

OTHER PUBLICATIONS

Sadakiyo et al., "Rational Designs for Highly Proton-Conductive Metal-Organic Frameworks," J. American Chemical Society, 2009, vol. 131, pp. 9906-9907.*
Okawa et al., "Oxalate-Bridged Bimetallic Complexes {NH(prol)3}[MCr(ox)3] (M=Mn", Fe" Co"; NH(prol)~+=Tri(3-hydroxypropyl)ammonium) Exhibiting Coexistent Ferromagnetism and Proton Conduction," J. American ChemicatSociety, 2009, vol. 131, pp. 13516-13522.*
Feb. 17, 2015 Office Action issued in Japanese Patent Application No. JP-2013-036918.
Okawa et al., "Oxalate-Bridged Bimetallic Complexes {NH(prol)$_3$}[MCr(ox)$_3$] (M—Mn", Fe" Co"; NH(prol)$_3^+$=Tri(3-hydroxypropyl)ammonium) Exhibiting Coexistent Ferromagnetism and Proton Conduction," *J. American Chemical Society*, 2009, vol. 131, pp. 13516-13522.

* cited by examiner

Fig. 1

Sample 1   Sample 2   Sample 3

ORGANIC POLYMER POROUS BODY

BACKGROUND OF THE INVENTION

The present invention relates to an organic polymer porous body, more specifically, an organic polymer porous body having a structure in which nitrogen-containing 5-membered rings or 6-membered rings are covalently bound via a carbon-carbon triple bond.

The term "metal organic framework (MOF)" means a porous material equipped with a structure in which an organic matter and a metal ion are linked alternately to each other. This MOF exhibits various functions (for example, ion conductivity), depending on its molecular structure or a kind of a guest molecule incorporated in the space. Many proposals have conventionally been made on such MOF.

For example, Non-Patent Document 1 discloses an MOF equipped with a two-dimensional layered structure composed of zinc and oxalic acid.

This document describes that the MOF having adipic acid incorporated between layers thereof through a hydrogen bond shows proton conductivity of $6 \times 10^{-6}$ Scm$^{-1}$ (25° C.)

Non-Patent document 2 discloses an MOF having a two-dimensional layered structure composed of chromium, iron, manganese, or cobalt and oxalic acid.

This document describes that the MOF having tris(3-hydroxypropyl)ammonium incorporated between layers thereof shows proton conductivity of $1 \times 10^{-4}$ Scm$^{-1}$ (25° C.)

Some of MOFs having ion conductivity are known to show conductivity higher than that of perfluorocarbon sulfonic acid typified by Nafion (trademark). MOFs, however, lack chemical stability (acid resistance) because they utilize a coordinate bond between a metal ion and an organic ligand. In addition to this problem, they cannot keep their crystallinity because they are crystalline compounds and cannot protect their long-distance atomic or ionic arrangement from dehydration caused by heat. This leads to a problem of low thermal stability. Further, they have toxicity due to the metal ion contained in them.

NON-PATENT DOCUMENTS

[Non-Patent Document 1] J. Am. Chem. Soc. 2009, 131, 9906
[Non-Patent Document 2] J. Am. Chem. Soc. 2009, 131, 13516

SUMMARY OF THE INVENTION

An object of the present invention is to provide an organic polymer porous body having high chemical stability and high thermal stability and at the same time, having less toxicity.

Another object of the present invention is to provide a novel organic polymer porous body having a high specific surface area and at the same time, functioning as an ion conductor.

With a view to achieving the abovementioned objects, the organic polymer porous body of the present invention has the following constitution:

(1) the organic polymer porous body has:
  a first cyclic structure having a 6-membered ring (A) or a 5-membered ring having three bonds,
  a second cyclic structure having a 6-membered ring (B) having two or three bonds, and
  a carbon-carbon triple bond that links the first cyclic structure to the second cyclic structure, and
(2) at least one of the first cyclic structure and the second cyclic structure contains at least one nitrogen atom.

The organic polymer porous body according to the present invention contains only a covalent bond and does not contain a coordinate bond between a metal ion and an organic ligand so that it has high chemical stability and high thermal stability and at the same time, has less toxicity.

In addition, since the first cyclic structure and the second cyclic structure are covalently bound to each other via a carbon-carbon triple bond so that it has a high specific surface area.

Further, the organic polymer porous body according to the present invention contains, in the first cyclic structure and/or second cyclic structure thereof, at least one nitrogen atom so that it functions as a proton conductor, which is presumed to occur because of proton conduction via a lone pair on the nitrogen atom.

DETAILED DESCRIPTION

One embodiment of the present invention will next be described in detail.

[1. Organic Polymer Porous Body]

The organic polymer porous body according to the present invention has the following constitution:

(1) the organic polymer porous body has:
  a first cyclic structure having a 6-membered ring (A) or a 5-membered ring having three bonds,
  a second cyclic structure having a 6-membered ring (B) having two or three bonds, and
  a carbon-carbon triple bond that links the first cyclic structure to the second cyclic structure, and
(2) at least one of the first cyclic structure and the second cyclic structure contains at least one nitrogen atom.

[1.1. First Cyclic Structure]

The first cyclic structure has a 6-membered ring (A) or a 5-membered ring having three bonds.

When the first structure has a 6-membered ring (A), the 6-membered ring (A) has a carbon atom at the 1-position, 3-position, and 5-position and it is covalently bound to a carbon-carbon triple bond via these carbon atoms. The 6-membered ring (A) may have, at another position thereof, a carbon atom or a nitrogen atom. This means that the 6-membered ring (A) can contain at most three nitrogen atoms.

When the first cyclic structure is a 5-membered ring, the 5-membered ring has, at the 1-position, 3-position and 4-position thereof, a carbon atom and it is covalently bound to a carbon-carbon triple bond via these carbon atoms. The 5-membered ring has, at another position thereof, a nitrogen atom.

[1.2. Second Cyclic Structure]

The second cyclic structure has a 6-membered ring (B) having two or three bonds.

When the second cyclic structure has two bonds, the 6-membered ring (B) has, at the 1-position and 4-position thereof, a carbon atom and is covalently bound to a carbon-carbon triple bond via these carbon atoms. The 6-membered ring (B) may have, at another position thereof, a carbon atom or a nitrogen atom. This means that the 6-membered ring (B) having two bonds can contain at most four nitrogen atoms.

When the second cyclic structure has three bonds, the 6-membered ring (B) has, at the 1-position, 3-position, and 5-position thereof, a carbon atom and is covalently bound to a carbon-carbon triple bond via these carbon atoms. The 6-membered ring (B) may have, at another position thereof, a carbon atom or a nitrogen atom. This means that the 6-membered ring (B) having three bonds can contain at most three nitrogen atoms.

[1.3. Nitrogen Atom]

In the present invention, at least one of the first cyclic structure and the second cyclic structure contains at least one nitrogen atom. This means that one of the first cyclic structure and the second cyclic structure may contain only a carbon atom and the other one may contain a nitrogen atom; or both of the first cyclic structure and the second cyclic structure may contain a nitrogen atom.

[1.4. Carbon-Carbon Triple Bond]

The first cyclic structure and the second cyclic structure are linked to each other via a carbon-carbon triple bond (—C≡C—).

An organic polymer porous body having a structure in which 6-membered rings or 5-membered rings are linked to each other in a closed ring form via a carbon-carbon-triple bond is obtained by copolymerizing a first monomer and a second monomer which will be described later.

In the present invention, an organic polymer porous body equipped with such a structure may hereinafter be called "covalent organic framework (COF)".

The COF is ideally in a hexagonal network form and has, at the vertex of the hexagon thereof, a 6-membered ring (A), a 6-membered ring (B), or a 5-membered ring each having three bonds. Depending on the kind of the monomer used, it has, on the side of the hexagon thereof, one or more 6-membered rings (B) having two bonds.

The carbon-carbon triple bond links:

(a) the 6-membered ring (A), the 6-membered ring (B) or the 5-membered ring, each present at the vertex of the hexagon, to each other;

(b) the 6-membered ring (A), the 6-membered ring (B), or the 5-membered ring present at the vertex of the hexagon and the 6-membered ring (B) present on the side of the vertex to each other; or (c) two of the six-membered rings (B) present on the side of the hexagon.

[1.5. Specific Examples of Organic Polymer Porous Body]

Some examples of the organic polymer porous body according to the present invention are shown in the following formulas (3.1) to (3.3).

[Chemical formula 1]

(3.1)

(3.2)

(3.3)

The organic polymer porous body represented by the formula (3.1) has:
(a) a 6-membered ring (A) composed only of carbon atoms and having three bonds,
(b) a 6-membered ring (B) containing three nitrogen atoms and having three bonds, and
(c) a carbon-carbon triple bond that links between the 6-membered ring (A) and the 6-membered ring (B).

The 6-membered ring (A) and the 6-membered ring (B) are located alternately at the vertexes of the hexagon, respectively.

The organic polymer porous body represented by the formula (3.2) has:
(a) a 6-membered ring (A) composed only of carbon atoms and having three bonds,
(b) a 6-membered ring (B) containing one nitrogen atom and having two bonds, and
(c) a carbon-carbon triple bond that links between the 6-membered ring (A) and the 6-membered ring (B).

The 6-membered ring (A) is located at the vertex of the hexagon. The 6-membered ring (B) is located on the side of the hexagon.

The organic polymer porous body represented by the formula (3.3) has:
(a) a 5-membered ring containing two nitrogen atoms and having three bonds,
(b) a 6-membered ring (B) composed only of carbon atoms and having three bonds, and
(c) a carbon-carbon triple bond that links between the 5-membered ring and the 6-membered ring (B).

The 5-membered ring and the 6-membered ring (B) are located at the vertexes of the hexagon, respectively.

[1.6. Specific Surface Area]

The organic polymer porous body according to the present invention has a structure in which 6-membered rings or a 5-membered ring are linked to each other in a network form via a carbon-carbon triple bond so that it has a large specific surface area. Optimizing the preparation conditions of it increases the specific surface area to 100 $m^2/g$ or greater, 300 $m^2/g$ or greater, or 600 $m^2/g$ or greater.

[1.7. Use]

The organic polymer porous body according to the present invention functions as a proton conductor because at least one of the 6-membered ring and the 5-membered ring of the porous body contains at least one nitrogen atom. The organic polymer porous body according to the present invention can therefore be used for electrolytes, ion conductors, ion exchange membranes, and the like to be used in various electrochemical devices such as fuel cells and oxygen sensors.

[2. Preparation Process of Organic Polymer Porous Body]

The organic polymer porous body according to the present invention can be prepared by copolymerizing:
one or more first monomers having the 6-membered ring (A) or the 5-membered ring and three first functional groups bound to the 6-membered ring (A) or the 5-membered ring; and
one or more second monomers having the 6-membered ring (B) and two or three second functional groups bound to the 6-membered ring (B).

[2.1. First Monomer]

The first monomer has a 6-membered ring (A) or a 5-membered ring and three first functional groups bound to the 6-membered ring (A) or the 5-membered ring. The number of the kinds of the first monomer to be used as the starting material may be one or two or more.

When the first monomer has a 6-membered ring (A), the 6-membered ring (A) has a carbon atom at the 1-position, 3-position, and 5-position thereof and the first functional group is bound to these carbon atoms. The 6-membered ring (A) may have, at another position thereof, a carbon atom or a nitrogen atom. This means that the 6-membered ring (A) can contain at most three nitrogen atoms.

When the first monomer has a 5-membered ring, the 5-membered ring has a carbon atom at the 1-position, 3-position, and 4-position thereof and a first functional group is bound to these carbon atoms. The 5-membered ring has, at another position thereof, a nitrogen atom.

[2.2. Second Monomer]

The second monomer has a 6-membered ring (B) and two or three second functional groups bound to the 6-membered ring (B). The number of the kinds of the second monomer to be used as the starting material may be one or two or more.

When the second monomer has two second functional groups, the 6-membered ring (B) has a carbon atom at the 1-position and 4-position thereof and the second functional group is bound to these carbon atoms. The 6-membered ring (B) may have, at another position thereof, a carbon atom or a nitrogen atom. This means that the 6-membered ring (B) having two second functional groups can contain at most four nitrogen atoms.

When the second monomer has three second functional groups, the 6-membered ring (B) has a carbon atom at the 1-position, 3-position, and 5-position thereof and the second functional group is bound to these carbon atoms. The 6-membered ring (B) may have, at another position thereof, a carbon atom or a nitrogen atom. This means that the 6-membered ring (B) having three second functional groups can contain at most three nitrogen atoms.

[2.3. First Functional Group and Second Functional Group]

No particular limitation is imposed on the first functional group and the second functional group insofar as they can react to each other to form a carbon-carbon triple bond that links the first cyclic structure to the second cyclic structure (in other words, that can form the abovementioned COF).

For relatively easy formation of the COF, it is preferred that one of the first functional group and the second functional group is a —C≡C—H group and the other one is F, Cl, Br, or I.

[2.4. Specific Examples of Monomer]

Specific examples of the first monomer and the second monomer will next be shown in the following formulas (1), (2.1), (2.2), and (2.3).

[Chemical formula 2]

(1)

$(X_1, X_2, X_3)$ = (N, N, N), (N, N, C), (N, C, C), or (C, C, C)

(2.1)

$(X_1, X_2, X_3)$ =
(N, N, N), (N, N, C),
(N, C, C), or (C, C, C)
$R_1, R_2, R_3$ = F, Cl, Br, or I

-continued (2.2)

$(X_1, X_2, X_3, X_4)$ =
(N, N, N, N), (N, N, C, C),
(N, C, C, N), or (C, C, C, C)
$R_1, R_2, R_3$ = F, Cl, Br, or I (2.3)

$(X_1, X_2)$ =
(NH, N)
$R_1, R_2, R_3$ =
F, Cl, Br, or I

The monomer represented by the formula (1) has a 6-membered ring and three functional groups (—C≡C—H groups). $X_1$ to $X_3$ may each represent either C or N.

The monomer represented by the formula (1) can be prepared by:

(a) reacting a monomer. (for example, 1,3,5-tribromobenzene) having a 6-membered ring that has three halogens bound thereto with trimethylsilylacetylene, and (b) converting the —C≡C-TMS group into a —C≡C—H group.

The monomer represented by the formula (2.1) has a 6-membered ring and three functional groups (—$R_1$ group to —$R_3$ group). $X_1$ to $X_3$ may each represent either C or N.

The monomer represented by the formula (2.1) is commercially available or can be prepared by a known method while using a monomer having a molecular structure analogous thereto as a starting material.

The monomer represented by the formula (2.2) has a 6-membered ring and two functional groups (—$R_1$ group, —$R_2$ group). $X_1$ to $X_4$ may each represent either C or N.

The monomer represented by the formula (2.2) is commercially available or can be prepared by a known method while using a monomer having a molecular structure analogous thereto as a starting material.

The monomer represented by the formula (2.3) has a 5-membered ring and three functional groups (—$R_1$ group to —$R_3$ group). $X_1$ and $X_2$ represent NH and N, respectively.

The monomer represented by the formula (2.3) is commercially available or can be prepared by a known method while using a monomer having a molecular structure analogous thereto as a starting material.

The monomer represented by the formula (2.2) corresponds to the abovementioned second monomer and the monomer represented by the formula (2.3) corresponds to the abovementioned first monomer.

The monomers represented by the formula (1) and the formula (2.1) may each become either the first monomer or the second monomer, depending on the kind of a monomer to be used in combination with them.

For example, when the monomer represented by the formula (1) (or the monomer represented by the formula (2.1)) is used as the first monomer and the monomer represented by the formula (2.1) (or the monomer represented by the formula (1)) is used as the second monomer, an organic polymer porous body having the structure represented by the formula (3.1) is obtained.

When the monomer represented by the formula (1) is used as the first monomer and the monomer represented by the formula (2.2) is used as the second monomer, an organic polymer porous body having the structure represented by the formula (3.2) is obtained.

When the monomer represented by the formula (2.3) is used as the first monomer and the monomer represented by the formula (1) is used as the second monomer, an organic polymer porous body having the structure represented by the formula (3.3) is obtained.

[2.5. Ratio of First Monomer to Second Monomer]

When the number of moles of the first functional group contained in the first monomer is equal to the number of moles of the second functional group contained in the second monomer, all the first functional groups and the second functional groups are ideally consumed for the formation of a COF.

The number of moles of the first functional group is not necessarily equal to the number of moles of the second functional group, and they may be a little different from each other. When the number of moles of one of the first functional group and the second functional group is excessively large or small, however, a large amount of either one of these monomers remains unreacted.

Accordingly, a molar ratio of the first monomer to the second monomer is preferably a ratio at which the molar ratio of the functional groups (the number of moles of the first functional group/the number of moles of the second functional group) falls within a range of from 0.9 to 1.5. The molar ratio of the functional groups is more preferably from 0.9 to 1.1.

[2.6. Copolymerization]

The organic polymer porous body according to the present invention can be obtained by copolymerizing under predetermined conditions the first monomer and the second monomer mixed at a predetermined ratio. The copolymerization conditions such as reaction temperature and reaction time are not particularly limited, and it is preferred to select optimum conditions, depending on the combination of the first monomer and the second monomer.

Copolymerization of the first monomer and the second monomer is usually conducted in the presence of a catalyst. It is preferred to select the most suitable catalyst, depending on the combination of the first functional group and the second functional group.

For example, when one of the first functional group and the second functional group is a —C≡C—H group and the other is F, Cl, Br, or I, it is preferred to use $PdCl_2(PPh_3)_2$, CuI, $Pd(PPh_3)_4$ or the like as a catalyst.

[3. Effect of Organic Polymer Porous Body]

The organic polymer porous body according to the present invention contains only a covalent bond and does not contain a coordinate bond between a metal ion and an organic ligand so that it has high chemical stability and high thermal stability, and has less toxicity.

In addition, it has a structure in which the first cyclic structure and the second cyclic structure are covalently bound to each other via a carbon-carbon triple bond so that it has a large specific surface area.

Further, the organic polymer porous body according to the present invention contains at least one nitrogen atom in the first cyclic structure and/or the second cyclic structure thereof so that it functions as a proton conductor, which is presumed to occur because of proton conduction via a lone pair on the nitrogen atom.

EXAMPLES

Examples 1 to 3

[1. Preparation of Sample]
[1.1. Synthesis of Monomers]
[1.1.1. Synthesis of 1,3,5-tris(trimethylsilylethynyl)benzene (synthesis conditions 1)]

After a 100-mL two-necked recovery flask was purged with argon, 1,3,5-tribromobenzene (3.2 mmol), $PdCl_2(PPh_3)_2$ (0.16 mmol), CuI (0.08 mmol), $iPr_2NH$ (15 ml), and THF (15 mL) were added to the flask to obtain a uniform solution. To the resulting uniform solution was added trimethylsilylacetylene (11 mmol). The resulting mixture was stirred at 80° C. for 14 hours. Then, the amine salt thus precipitated was filtered off and the filtrate was concentrated using an evaporator. The residue thus obtained was purified using column chromatography (developing solvent: hexane:dichloromethane=8:1). The intended product was obtained in an amount of 1.2 g in a yield of 99%.

[1.1.2. Synthesis of 1,3,5-triethynylbenzene (Synthesis Conditions 2)]

1,3,5-tris(trimethylsilylethynyl)benzene (3.2 mmol), THF (24 mL), and $H_2O$ (5 drops) were added to a 200-mL recovery flask. After the resulting mixture was cooled to 0° C., tetrabutylammonium fluoride (TBAF) (1.0M in THF, 9.5 mmol, 9.5 mL) was added. The resulting solution was stirred at room temperature for one hour, followed by concentration by using an evaporator. The residue was purified by column chromatography (developing solvent: hexane:dichloromethane=8:1). The intended product was obtained in an amount of 0.4 g in a yield of 85%.

[1.2. Synthesis of Polymer]
[1.2.1. Synthesis of Organic Polymer Porous Body (Sample 1) (Synthesis Conditions 3)]

After a 50-mL two-necked recovery flask was purged with argon, 1,3,5-triethynylbenzene (0.67 mmol), 2,4,6-trichlorotriazine (0.67 mmol), $Pd(PPh_3)_4$ (0.053 mmol, 62 mg), CuI (0.11 mmol, 20 mg), $iPr_2NH$ (2 mL), and DMF (2 mL) were added to the flask to obtain a uniform solution. The resulting uniform solution was heated to 80° C., followed by stirring for 72 hours. Suction filtration was conducted and the solid thus obtained was washed with chloroform, water, and ethanol. The intended product was obtained in an amount of 0.27 g. This sample will hereinafter be abbreviated as "COF(tri)".

[1.2.2. Synthesis of Organic Polymer Porous Body (Sample 2) (Synthesis Conditions 4)]

Synthesis of a polymer was conducted in a manner similar to that of the synthesis of COF(tri) except for the use of 2,5-dibromopyridine (0.67 mmol) instead of 2,4,6-trichlorotriazine. The intended product was obtained in an amount of 0.35 g. The sample thus obtained will hereinafter be abbreviated as "COF(py)".

[1.2.3. Synthesis of Organic Polymer Porous Body (Sample 3) (Synthesis Conditions 5)]

Synthesis of a polymer was conducted in a manner similar to that of the synthesis of COF(tri) except for the use of 2,4,5-tribromoimidazole (0.67 mmol) instead of 2,4,6-trichlorotriazine. The intended product was obtained in an amount of 0.30 g. The sample thus obtained will hereinafter be abbreviated as "COF(im)".

A synthesis scheme of the monomers and the organic polymer porous bodies will next be shown.

[Chemical formula 3]

COF (tri)

-continued

[2. Test Method]
[2.1. Conductivity]

A green compact having a thickness of about 200 μm was obtained by putting 30 mg of powders in a tablet maker having a diameter of 1 cm and retaining it for one minute at a pressure of 200 k f/cm$^2$ (19.6 MPa) by using a hydraulic press. The green compact thus obtained was placed in a conductivity test cell and the conductivity of it in a film thickness direction was measured. The measurement was conducted by using a two-terminal AC method at a frequency of from 50 Hz to 50 MHz, temperature of 25° C., and relative humidity of 100%.

[2.2. IR Spectrum]

The IR spectrum of the organic polymer porous body was measured.

[2.3. Nitrogen Adsorption Isotherm]

The nitrogen adsorption isotherm of the organic polymer porous body was measured. The measurement was conducted after deaeration treatment at 100° C.

[2.4. XRD Pattern]

The XRD pattern of the organic polymer porous body was measured. It was measured using Cu—K$_\alpha$ ray.

[3. Results]
[3.1. Conductivity]

Figure 1:
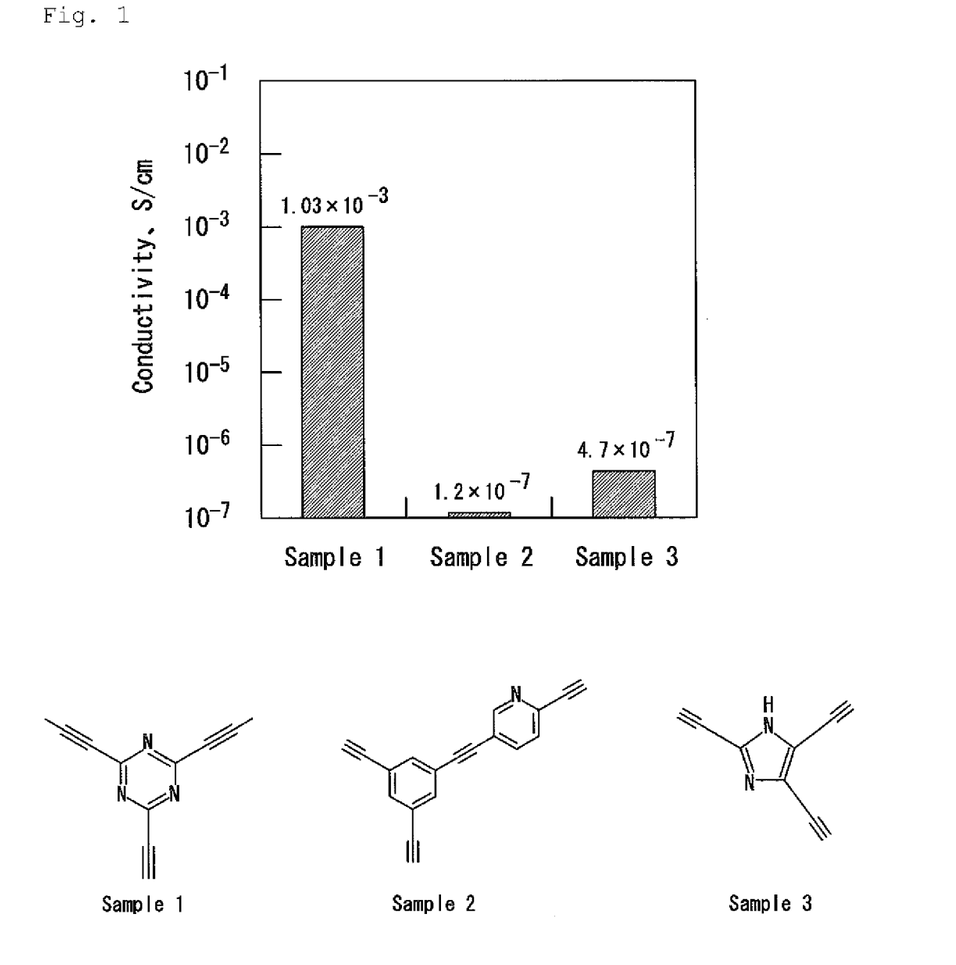
FIG. 1 shows conductivity of various organic polymer porous bodies.

FIG. 1 shows the conductivity of various organic polymer porous bodies. It is apparent from the graph that Sample 1, Sample 2, and Sample 3 had conductivity of $1.03\times10^{-3}$, $1.2\times10^{-7}$, and $4.7\times10^{-7}$ S/cm, respectively. The synthesized organic polymer porous bodies show predetermined conductivity in spite of having no acid group, presumably because of proton conduction via a lone pair on the nitrogen atom contained in their cyclic structure.

[3.2. IR Spectrum]

Figure 2:
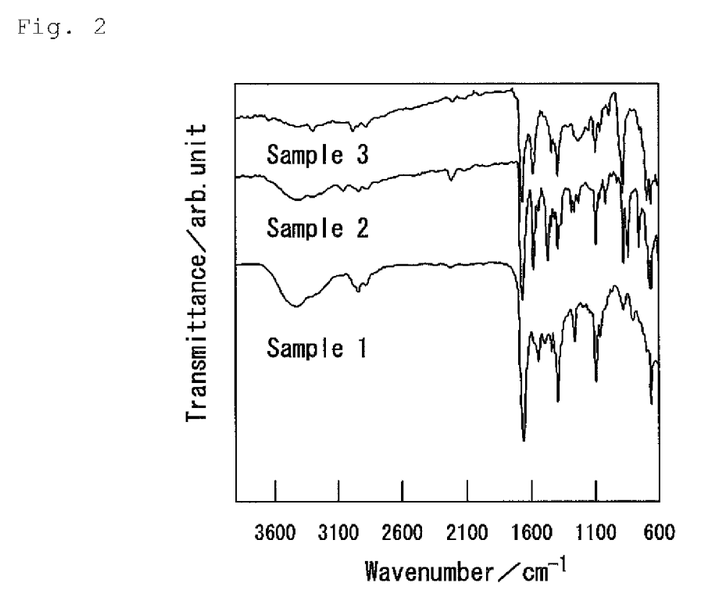
FIG. 2 is an IR spectrum of various organic polymer porous bodies.

FIG. 2 shows the IR spectrum of various organic polymer porous bodies. It is apparent from FIG. 2 that strong and sharp absorption (near 3000 cm$^{-1}$) of CH, which is characteristic of —C≡C—H in the raw material, has disappeared, suggesting that a large portion of the raw material has completed its reaction and polymerization, and a polymer has been formed.

[3.3. Nitrogen Adsorption Isotherm]

Figure 3:
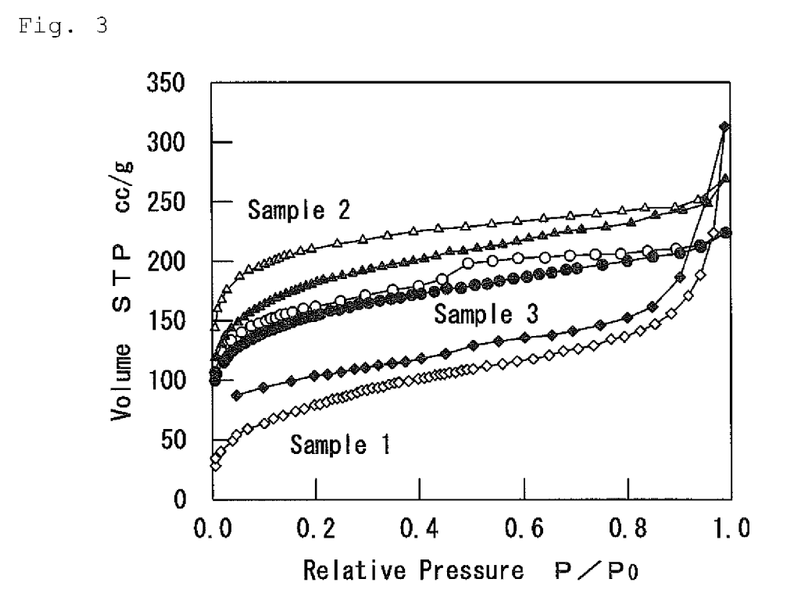
FIG. 3 is a nitrogen adsorption isotherm of various organic polymer porous bodies.

FIG. 3 shows the nitrogen adsorption isotherm of various organic polymer porous bodies. It is apparent from FIG. 3 that they are materials of a high specific surface area with pores.

[3.4. XRD Pattern]

Figure 4:
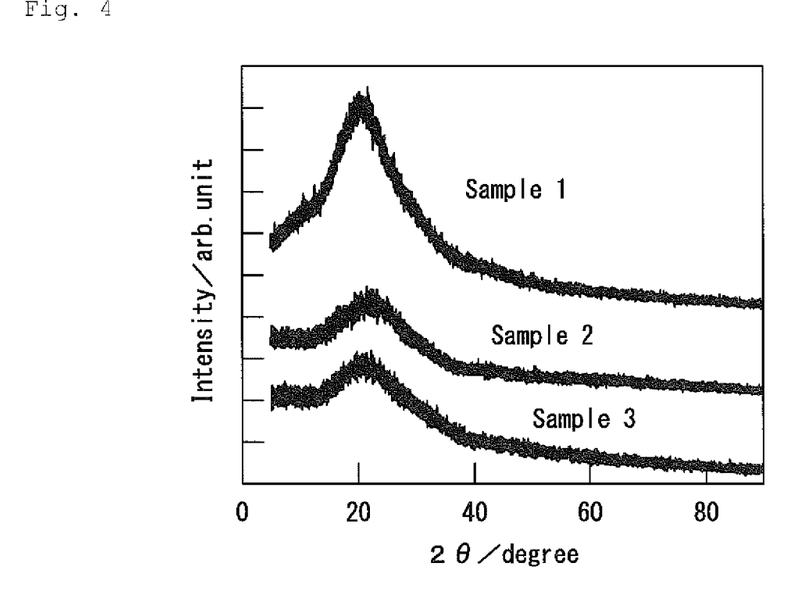
FIG. 4 is an XRD pattern of various organic polymer porous bodies.

FIG. 4 shows the XRD pattern of various organic polymer porous bodies. It is apparent from FIG. 4 that each sample has a weak peak at a position of 2θ=about 20 degrees, which is presumed to suggest:

(a) that a polymer material in which 6-membered rings or a 5-membered ring are covalently bound to each other via a carbon-carbon triple bond has been formed; and

(b) 6-membered rings or 5-membered rings have been stacked at predetermined intervals.

Embodiments of the present invention have been described above in detail. It should, however, be borne in mind that the present invention is not limited by these embodiments and can be modified in various ways without departing from the scope of the present invention.

The organic polymer porous body according to the present invention can be used for electrolytes, ion conductors, ion exchange membranes, and the like to be used for various electrochemical devices such as fuel cells and oxygen sensors.

What is claimed is:

1. An organic polymer porous body comprising the following constitution, wherein:
   (1) the organic polymer porous body includes:
      a first cyclic structure having a 6-membered ring (A) or a 5-membered ring having three single bonds attached on the ring,
      a second cyclic structure having a 6-membered ring (B) having three single bonds attached on the ring, and
      a carbon-carbon triple bond that links the first cyclic structure to the second cyclic structure;
   (2) at least one of the first cyclic structure and the second cyclic structure contains at least one nitrogen atom on the ring; and
   (3) the organic polymer porous body is obtained by copylymerizing:
      a monomer represented by the following formula (1):

(1)

$(X_1, X_2, X_3) = (N, N, N), (N, N, C),$
$(N, C, C), or (C, C, C)$ and
   a monomer represented by the following formula (2.1) or formula (2.3):

(2.1)

$(X_1, X_2, X_3) = (N, N, N), (N, N, C),$
$(N, C, C), or (C, C, C)$
$R_1, R_2, R_3 = F, Cl, Br, or I$

(2.3)

$(X_1, X_2) = (NH, N)$
$R_1, R_2, R_3 = F, Cl, Br, or I$

2. The organic polymer porous body according to claim 1, to be used as a proton conductor.

3. The organic polymer porous body according to claim 1, having a specific surface area of 100 m²/g or greater.

4. The organic polymer porous body according to claim 1 comprising a structure represented by the following formula (3.1) or formula (3.3):

(3.1)

(3.3)

* * * * *